(12) United States Patent
Edmondson

(10) Patent No.: US 7,118,670 B2
(45) Date of Patent: Oct. 10, 2006

(54) ENERGY EFFICIENT COMPACT OIL AND WATER SEPARATOR

(76) Inventor: Jerry M. Edmondson, 2 Escapade Ct., Newport Beach, CA (US) 92663

( * ) Notice: Subject to any disclaimer, the term of this patent is extended or adjusted under 35 U.S.C. 154(b) by 184 days.

(21) Appl. No.: 10/828,424

(22) Filed: Apr. 20, 2004

(65) Prior Publication Data

US 2005/0230296 A1  Oct. 20, 2005

(51) Int. Cl.
*B01D 17/028* (2006.01)
(52) U.S. Cl. .................. 210/187; 210/418; 210/522; 210/532.1; 210/540; 210/DIG. 5
(58) Field of Classification Search ............ 210/187, 210/243, 521, 522, 532.1, 540, DIG. 5, 418, 210/539; 204/666; 95/253
See application file for complete search history.

(56) References Cited

U.S. PATENT DOCUMENTS

| | | | | |
|---|---|---|---|---|
| 4,581,120 A | * | 4/1986 | Sublette | 204/666 |
| 4,919,777 A | * | 4/1990 | Bull | 204/563 |
| 5,865,992 A | * | 2/1999 | Edmondson | 210/180 |
| 5,902,483 A | * | 5/1999 | Edmondson | 210/521 |
| 6,315,898 B1 | * | 11/2001 | Bull | 210/187 |
| 6,827,865 B1 | * | 12/2004 | Fenwick | 210/802 |

\* cited by examiner

*Primary Examiner*—Matthew O. Savage

(57) ABSTRACT

An energy efficient and compact oil and water separator through which the oil and water flow for the purpose of extracting water from the oil and oil from the water made more efficient and compact by incorporating a precise control of the hydrodynamics through the application of permeable barriers on which the permeability is adjustable to compensate for variations in flow rate, density and viscosity of the oil and water, a downward flow of the oil through an electric field to mitigate the problem of high water content causing an electrical short circuiting of the electric field and a heating means with enhanced heat exchange capability.

11 Claims, 1 Drawing Sheet

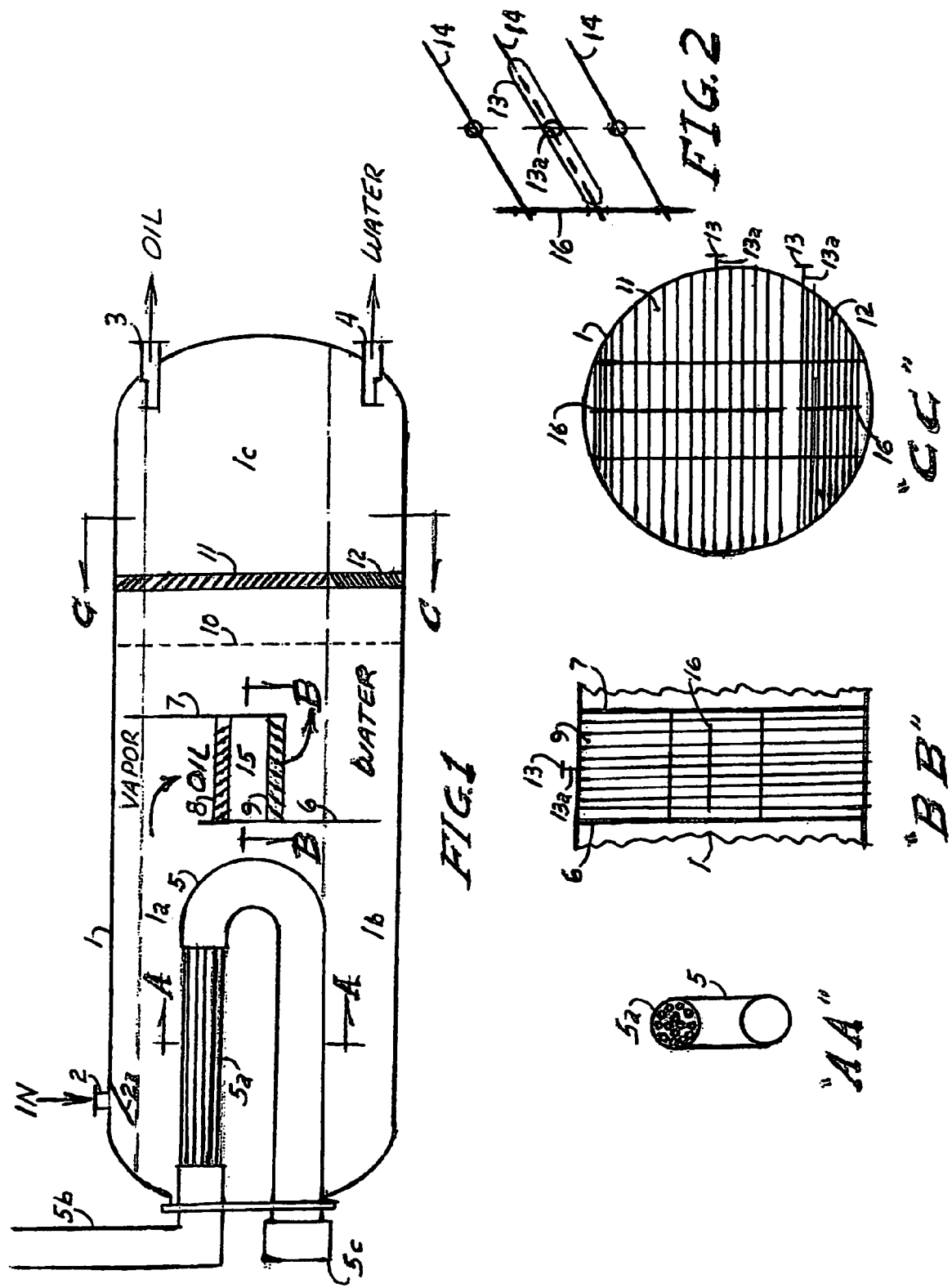

ENERGY EFFICIENT COMPACT OIL AND WATER SEPARATOR

FIELD OF THE INVENTION

This invention relates to oil and water separators, particularly those incorporating gravity separation to separate the water from the oil.

BACKGROUND OF THE INVENTION

My U.S. Pat. Nos. 5,865,992 and 5902493, Buchanan U.S. Pat. No. 6,207,032 and Bull U.S. Pat. No. 6,315,898 all described methods and/or apparatuses used to separate water from flowing oil and while each of these teach ways and means to efficiently employ enhanced gravity separation utilizing horizontal containment vessels and to compensate, to some degree, for varying total flow rates within the vessel none addresses the fact that the water and oil generally flow at different flow rates with variations in density and viscosity. Further, both the Buchanan and Bull inventions employ means for adjusting flow areas within the vessels, whereby the flow area is adjusted for either the flow rate of the oil or the flow rate of the water but not discreetly for both. The Buchanan and Bull patents employ a horizontal flow direction through the electric field when the electric field is employed, utilizing electrified and/or grounded grids that are positioned vertically with the lower edge of the electrified grids being above the oil/water interface to prevent electrical short circuiting of the electrified grid to the water phase. This arrangement exposes a flow path beneath the grids whereby a substantial quantity of the oil may pass without contacting the electric field. As the water separates from the oil within the horizontal flow path and settles into the water phase, the water content can become concentrated in the electric field immediately above the oil/water interface to the extent that electrical short circuiting may occur.

If heating is necessary to enhance the oil and water separation both the Buchanan and Bull inventions employ long U tube fireboxes with low overall fuel efficiency.

The deficiencies of the prior inventions require that the size of the containment vessels be increased to compensate for the inefficiency and also in the case of the Buchanan and Bull inventions more fuel will be consumed when heating is required.

As it is becoming necessary to explore and produce petroleum from more remote locations, often "water bound", it is becoming important to reduce the "footprint" of the oil and water separators. Therefore it is essential to devise means and methods for improving the performance efficiency of oil and water separators. Accordingly my invention improves the method and apparatus to the extent that for any given flow rate the containment vessel can be made smaller and when heating is required, less fuel will be consumed than with prior inventions.

SUMMARY

Through the implementation of precise hydrodynamics control and unique efficient heating means this invention reduces the containment vessel size and saves fuel. It overcomes the problem of some oil bypassing the electric field, water accumulation and electrical short circuiting in the electric field by incorporation of a novel structure that imparts a downward flow direction through the electric field. Residence time of the fluid within the vessel is maximized by eliminating hydraulic short circuiting through the employment of permeable barriers whereupon the permeability is discreetly adjustable to compensate for variations of flow rate, density and viscosity of the fluids being processed and overall fuel efficiency is improved and fire-tube length reduced by utilizing a multi-tube heat exchange segment on the U tube.

The present invention provides an oil and water separator including a horizontal cylindrical vessel closed on both ends with an inlet conduit adjacent one end for receiving a constant flowing mixture of oil and water and an oil outlet conduit in an upper region of the other end for discharging water free oil from said vessel and a water outlet conduit in a lower region of the other end for discharging oil free water from said vessel, and within said vessel intersecting said constant flowing mixture, a permeable baffle constructed in such a way as to apply a principle of capillary attraction to cause non-continuous phase fluids to be separated from continuous phase fluids and, on a downstream side of said permeable baffle, an upper permeable barrier a permeability of said upper permeable barrier and a permeability of said lower permeable barrier may be discreetly adjusted relative one another to accommodate a variation of flow characteristics of said oil and said water. The upper and lower permeable barriers are in the form of separate louvered structures each including louvers that are rotatable and discreetly variable in each of the said oil flow path and the said water flow. Handles can be provided for rotating the louvers external to said separator, and wherein the handles are connected to the rotatable louvered structures in a manner that the position of said handles indicate the position of said louvers. In upstream relationship to said permeable baffle and said upper and lower permeable barriers, there may be placed in the path of said constant flowing mixture a heating element for the purpose of heating said mixture to reduce its viscosity. The heating element is in the shape of a horizontally oriented "U" with a burner attached on one end of said "U" and an exhaust stack attached on the other end, and constructed so that at least a portion of the "U" side of said heating element to which said exhaust stack is attached has a multi-tube construction to increase the heat exchange surface on said portion of the "U" side of said heating element.

The invention further provides an oil and water separator within which a constant flowing mixture of oil and water is treated to separate said oil and said water including a horizontal cylindrical vessel closed on both ends with an inlet conduit adjacent one end for receiving said mixture and an oil outlet conduit in an upper region of the other end establishing a top level of the oil and for delivering water free oil from said separator and a water outlet conduit in a lower region of said other end for delivering oil free water from said separator, and within said separator, a distinct interface of the said oil and said water, a first solid partial baffle having its top edge below said top level of said oil and its bottom edge below said distinct interface and a second solid partial baffle in downstream relationship to said first baffle with its top edge above said top level of said oil and its bottom edge above said distinct interface, the purpose of said first and second solid partial baffles being to route said constant flowing mixture in a downward direction through a cross section of a space formed by said first baffle and said second baffle and the sidewall of said cylindrical vessel, at least one permeable barrier disposed in said space traversing said cross section having a permeability that can be regulated to adjust for variations in flow characteristics of said constant flowing mixture. Located within said vessel and in upstream relationship to said first and second solid partial baffles within the flow path of said constant flowing mixture of oil and water a horizontally oriented U shaped fire tube with a burner attached to one end and an exhaust stack on the other end and including on the portion of the of said fire tube to which said exhaust stack is attached a multi-tube section for the purpose of increasing the heat exchange surface area on said section. Traversing the flow path of said constant flowing mixture of oil and water and in downstream relationship to said first and second solid partial baffles a permeable baffle constructed in a manner to apply the principle of capillary action in cooperation with a permeable barrier upon which the permeability is discretely adjustable in various locations of same said permeable barrier to compensate for variations in the flow characteristics of said constant flowing mixture. There are two permeable barriers one above the other traversing said cross section of said space formed by said first and second solid partial baffles and said side wall of said vessel, the uppermost permeable barrier located adjacent said top edge of said first baffle and the lowermost permeable barrier located adjacent said bottom edge of said second baffle.

The invention additionally provides an oil and water separator receiving a constant flowing mixture of oil and water for the purpose of separating said mixture and delivering from said separator water free oil and oil free water including a horizontal cylindrical vessel closed on both ends with an inlet adjacent one end and an oil outlet in an upper region of said vessel at the other end for establishing a top level of the oil and discharging said oil and in the lower region of said vessel at said other end a water outlet and within said vessel is maintained a distinct water and oil interface, a first solid partition having its top edge below the said top level of the oil and its bottom edge below the said water and oil interface and a second solid partition having its top edge above said top level of the oil and its bottom edge above the said water and oil interface, and traversing a cross section of a space formed by the said first and second solid partitions and the sidewall of the said vessel, two permeable barriers of rotatable louver construction positioned one above the other with the top permeable barrier located adjacent the top edge of said first partition and the lower permeable barrier located adjacent the bottom edge of said second partition, said louver structure being connected to a handle that is external to said vessel side wall in a manner that said louvers can be rotated by said handle and said handle will indicate the angle to which the louvers are rotated, and in downstream relationship to said first and second solid partitions in the flow path of said constant flowing mixture, a permeable baffle constructed in a manner to apply a principle of capillary attraction and in cooperation with the said permeable baffle, a permeable barrier of rotatable louver construction having the louvers connected to handles exterior to said vessel side wall in a manner that said louvers can be independently rotated using said handles to discretely vary the permeability of said barrier at various areas of said barrier to compensate for different flow characteristics of said constant flowing mixture with said handle indicating the angle to which the louver is rotated.

BRIEF DESCRIPTION OF THE DRAWINGS

FIG. 1. is a side view schematic drawing showing all of the elements of the preferred embodiment of the invention.

View AA. is a cross section of the heating element showing the multitube section on the exhaust side of the U tube.

View BB. is from above the permeable barrier transverse to the flow path diversion structure.

View CC. is a cross section of the permeable barriers transverse to the oil and water flow paths downstream of the flow path diversion structure.

FIG. 2. is a schematic illustration of the external manipulator as an indicator of the angular direction of the louvers.

DESCRIPTION OF THE PREFERRED EMBODIMENT

Referring to the drawings there is disclosed an energy efficient compact oil and water separator wherein water will be extracted from oil and oil extracted from water, employing a unique array of novel structures that cause the extraction of the water and oil to be more complete and efficient than with prior inventions.

A mixture of oil and water enter the containment vessel 1 through the inlet conduit 2 impacting a deflector means 2a to impede the momentum of the entering mixture. Oil will migrate to an upper region 1a of the containment vessel and the water will migrate to a lower region 1b. The objective is to have water free oil exit the oil outlet conduit 3 and oil free water exit the water outlet conduit 4 with the minimum expenditure of time and energy.

To accomplish this objective it is usually necessary to heat the oil to lower the viscosity. With my invention this is accomplished utilizing a U shaped firetube that has a burner 5c on one end and an exhaust stack 5b on the other end and includes a novel multitube heat exchange section 5a on the exhaust side of the U tube to increase the surface area of the firetube and thus improve the heat exchange efficiency while decreasing the physical size of the firetube and the burner. After the oil viscosity reduction it is common to pass the oil through an electric field to coalesce the entrained water drops for faster gravity separation. With my invention this is more efficiently accomplished by causing the oil to flow downward through the electric field 15 rather than horizontally or upward as with prior inventions. The downward flow will purge the coalesced water drops from the electric field preventing the concentration of water in the electric field from becoming high enough to cause electrical short circuiting.

A flow diversion structure is formed by solid baffle 6 which has its upper edge below the vapor/oil interface and its lower edge below the oil/water interface and solid baffle 7 which has its upper edge above the vapor/oil interface and its lower edge above the oil/water interface. To further enhance the effectiveness of the downward flow there are permeable barriers 8 and 9 transverse to the space within the flow diversion structure to implement a vertical plug flow through the flow diversion structure. The permeability of the permeable barriers shall be discretely variable to compensate for differences in flow rate, density and viscosity.

As opposed to the prior inventions where the oil might exit the vessel immediately upon departing the electric field my invention incorporates a second stage of water drop coalescing and gravity separation in the aft region 1c of the containment vessel. The space for the second stage of coalescing and gravity separation is afforded by the compactness of the electric field 15 of my invention which is permitted by the downward flow through the electric field enhanced by the application of the permeable barriers.

The second stage of coalescing and gravity separation is formed by capillary coalescing baffle 10 as described by my patent U.S. Pat. No. 5,902,483 and permeable barrier 11 transverse to the oil flow path and permeable barrier 12 transverse to the water flow path each having its permeability discretely variable to compensate for differences in flow rate, density and viscosity.

FIG. 2 is a schematic detail illustrating one type of structure that can be utilized to provide discretely variable permeability of the permeable barriers. In this embodiment of my invention the permeable barrier will be in the form of a louvered shutter with rotatable louvers. Item 14 represents a rotatable louver connected to rotatable shaft 13a that penetrates the containment vessel wall and to which a handle 13 is externally connected. There shall be a packing gland (not shown) that seals the containment vessel at the point of shaft penetration. The rotatable louver is connected to other rotatable louvers by a connecting rod 16 in such a manner that a series of louvers will be rotated at the same time. The handle will be attached to the rotatable shaft so that its angular direction corresponds to the angular position of the louvers.

It will be understood that certain features and subcombinations are of utility and may be employed without reference to other features and subcombinations. This is contemplated by and within the scope of the appended claims. It can be readily seen that the objectives and advantages are realized as disclosed by this specification and will be even further understood as described by the appended claims.

What I claim is:

1. An oil and water separator comprising a horizontal cylindrical vessel closed on both ends with an inlet conduit adjacent one end for receiving a constant flowing mixture of oil and water and an oil outlet conduit in an upper region of the other end for discharging water free oil from said vessel and a water outlet conduit in a lower region of the other end for discharging oil free water from said vessel, and within said vessel intersecting said constant flowing mixture, a permeable baffle constructed in such a way as to apply a principle of capillary attraction to cause non-continuous phase fluids to be separated from continuous phase fluids and, on a downstream side of said permeable baffle, an upper permeable barrier disposed transverse to and in a horizontal oil flow oath of the separator and a lower permeable barrier disposed below said upper permeable barrier and transverse to and in a horizontal water flow oath in the separator, wherein a permeability of said upper permeable barrier and a permeability of said lower permeable barrier may be discretely adjusted relative one another to accommodate a variation of flow characteristics of said oil and said water.

2. The separator as described by claim 1 wherein the said upper and lower permeable barriers are in the form of separate louvered structures each including louvers that are rotatable and discretely variable in each of the said oil flow path and the said water flow path.

3. The separator as described by claim 2 where there are handles for rotating the louvers external to said separator, and wherein the handles are connected to the rotatable louvered structures in a manner that the position of said handles indicate the position of said louvers.

4. The separator as described by claim 1 where in upstream relationship to said permeable baffle and said upper and lower permeable barriers there may be placed in the path of said constant flowing mixture a heating element for the purpose of heating said mixture to reduce its viscosity.

5. The separator of claim 4 where said heating element is in the shape of a horizontally oriented "U" with a burner attached on one end of said "U" and an exhaust stack attached on the other end, and constructed so that at least a portion of the "U" side of said heating element to which said exhaust stack is attached has a multi-tube construction to increase the heat exchange surface on said portion of the "U" side of said heating element.

6. An oil and water separator within which a constant flowing mixture of oil and water is treated to separate said oil and said water comprising a horizontal cylindrical vessel closed on both ends with an inlet conduit adjacent one end for receiving said mixture and an oil outlet conduit in an upper region of the other end establishing a top level of the oil and for delivering water free oil from said separator and a water outlet conduit in a lower region of said other end for delivering oil free water from said separator., and within said separator, a distinct interface of the said oil and said water, a first solid partial baffle having its top edge below said top level of said oil and its bottom edge below said distinct interface and a second solid partial baffle in downstream relationship to said first baffle with its top edge above said top level of said oil and its bottom edge above said distinct interface, the purpose of said first and second solid partial baffles being to route said constant flowing mixture in a downward direction through a cross section of a space formed by said first baffle and said second baffle and the sidewall of said cylindrical vessel, at least one permeable barrier disposed in said space traversing said cross section having a permeability that can be regulated to adjust for variations in flow characteristics of said constant flowing mixture.

7. The oil and water separator of claim 6 including located within said vessel and in upstream relationship to said first and second solid partial baffles within the flow path of said constant flowing mixture of oil and water a horizontally oriented U shaped firetube with a burner attached to one end and an exhaust stack on the other end and including on the portion of the of said firetube to which said exhaust stack is attached a multi-tube section for the purpose of increasing the heat exchange surface area on said section.

8. The oil and water separator of claim 6 including traversing the flow path of said constant flowing mixture of oil and water and in downstream relationship to said first and second solid partial baffles a permeable baffle constructed in a manner to apply the principle of capillary attraction in cooperation with a permeable barrier upon which the permeability is discretely adjustable in various locations of same said permeable barrier to compensate for variations in the flow characteristics of said constant flowing mixture.

9. The oil and water separator of claim 6 wherein there are two permeable barriers one above the other traversing said cross section of said space formed by said first and second solid partial baffles and said side wall of said vessels, the uppermost permeable barrier located adjacent said top edge of said first baffle and the lowermost permeable barrier located adjacent said bottom edge of said second baffle.

10. The oil and water separator of claim 9 whereby the said two permeable barriers are of a rotatable louver construction and including external to said vessel side wall a handle that is connected to said rotatable louver structure in a manner that said handle can be used to rotate the louvers and at the same time will indicate the angle to which the louvers are rotated.

11. An oil and water separator receiving a constant flowing mixture of oil and water for the purpose of separating said mixture and delivering from said separator water free oil and oil free water comprising a horizontal cylindrical vessel closed on both ends with an inlet adjacent one end and an oil outlet in an upper region of said vessel at the other end for establishing a top level of the oil and discharging said oil and in the lower region of said vessel at said other end a water outlet and within said vessel is maintained a distinct water and oil interface, a first solid partition having its top edge below the said top level of the oil and its bottom edge below the said water and oil interface and a second solid partition having its top edge above said top level of the oil and its bottom edge above the said water and oil interface, and traversing a cross section of a space formed by the said first and second solid partitions and the sidewall of the said vessel, two permeable barriers of rotatable louver construction positioned one above the other with the top permeable barrier located adjacent the top edge of said first partition and the lower permeable barrier located adjacent the bottom edge of said second partition, said louver structure being connected to a handle that is external to said vessel side wall in a manner that said louvers can be rotated by said handle and said handle will indicate the angle to which the louvers are rotated, and in downstream relationship to said first and second solid partitions in the flow path of said constant flowing mixture, a permeable baffle constructed in a manner to apply a principle of capillary attraction and in cooperation with the said permeable baffle, a permeable barrier of rotatable louver construction having the louvers connected to handles exterior to said vessel side wall in a manner that said louvers can be independently rotated using said handles to discretely vary the permeability of said barrier at various areas of said barrier to compensate for different flow characteristics of said constant flowing mixture with said handle indicating the angle to which the louver is rotated.

* * * * *